United States Patent Office 3,281,665
Patented Oct. 25, 1966

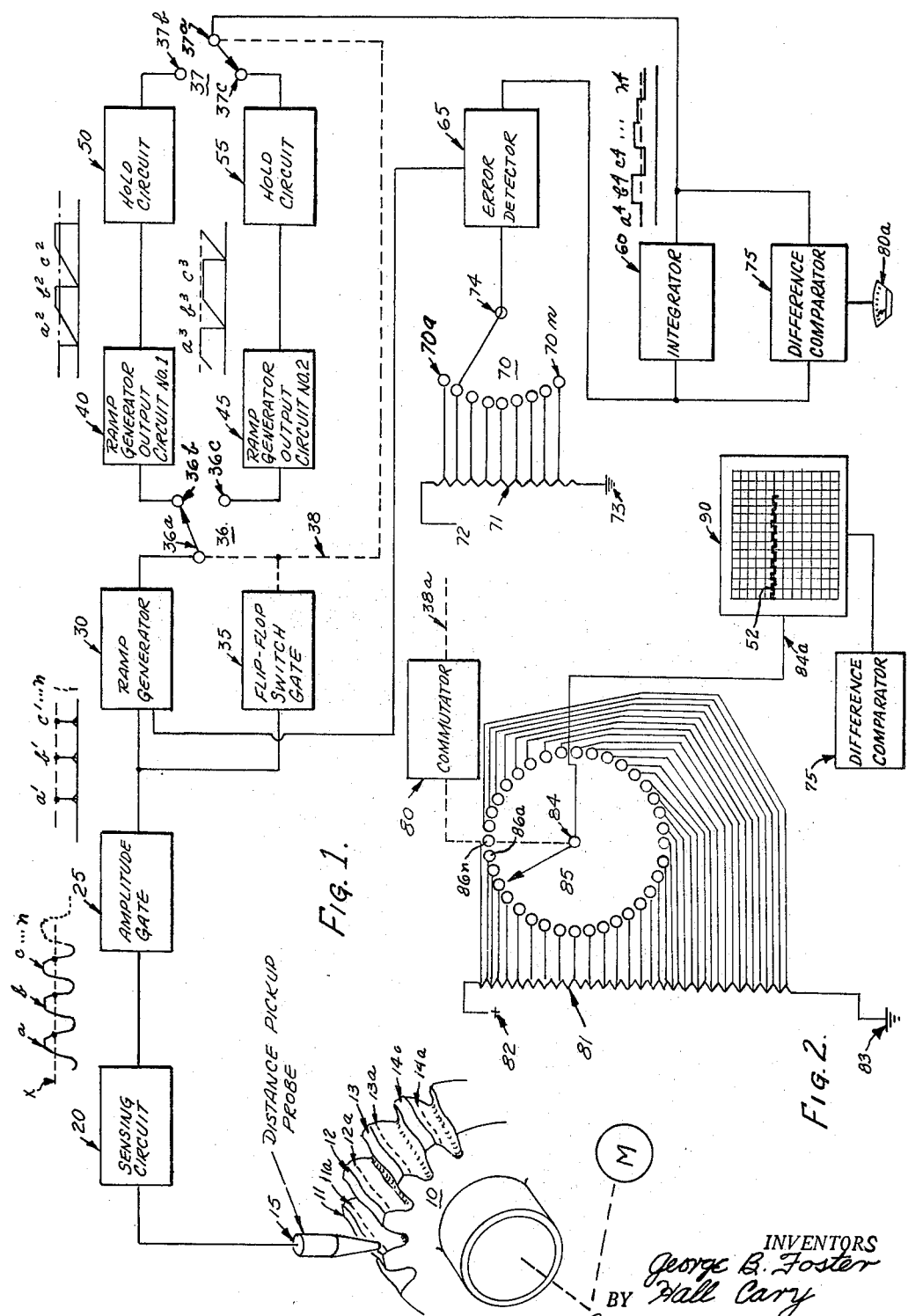

3,281,665
SYSTEM FOR MEASURING THE SPACING BETWEEN PARTS OF A STRUCTURE UTILIZING A PROBE WHOSE OUTPUT IS MODULATED BY SAID SPACING
George B. Foster and Hall Cary, Worthington, Ohio, assignors, by mesne assignments, to The Reliance Electric and Engineering Company, Cleveland, Ohio, a corporation of Ohio
Filed Oct. 8, 1962, Ser. No. 228,876
2 Claims. (Cl. 324—34)

This invention relates generally to an inspection system for industrially manufactured products and specifically to the method and means of determining with precision the critical dimensions between sections or parts of a product.

In this particular instance, the product referred to, i.e., the workpiece, is that of a gear. It will be apparent, however, that the present invention is applicable to the similar measurements of other products, such as splines.

In the manufacture of gears for machinery requiring a high degree of accuracy in operation with a minimum of noise and wear, such as those used in missiles, high speed aircraft, and industrial precision equipment, the prior art inspection systems for these components have not kept abreast of the developments of the machines. The instruments that are commercially available for the inspection of gears may be classed as the sampling laboratory type. In those instances where production quantities are more important than accuracy in the workpiece, a crude inspection measurement is made; this may include measuring three or more teeth at a time. Where high precision in the workpiece is required, a more accurate type of measuring system is used—but still on a sampling basis. Further in a single set of measurements of gear tooth spacing, the measurement may take as much as eight hours per gear, consequently making it impractical to measure every gear in a production lot. In addition, the prior art systems have been extremely complicated, very expensive, and utilize principles of operation that compare the gear teeth with a master. The master is not only subject to wear but may be just as inaccurate as the gear under inspection. The techniques employed are at best only a compromise and do not meet the present day demands of reliability.

The present invention overcomes the noted disadvantages of the prior art systems by providing an inspection system capable of measuring with sufficient rapidity and continuity the spacing betwen each and every tooth in a gear structure. But of even more importance, the present invention is capable of making these measurements with an accuracy heretofore unobtainable—even with the prior art laboratory test instruments. The present invention does not employ contact elements and therefore is adaptable to industrial processes without interference or modification of the machinery or process. In this way, each and every tooth in each gear structure may be measured as it is being produced by the manufacturing process.

It is, accordingly, a principal object of the present invention to provide a new and improved measuring and inspection system for industrially manufactured products.

A further object of the present invention is to provide a new measuring system for determining with precision the spacing between sections or parts of an industrially manufactured product.

Another object of the present invention is to provide a new measuring system for gear structures or the like that is capable of measuring each and every tooth in the structure as it is being produced.

Still another object of the present invention is to provide a new measuring system for a gear structure or the like that does not employ workpiece contact elements and that is adaptable to present day machinery and process without modification to the machinery or process.

Other objects and features of the present invention will become apparent from the following detailed description when taken in conjunction with the drawings in which:

FIG. 1 is a block schematic diagram of the electronic circitury of a preferred embodiment for the inspection and measurement of the spacing between teeth; and FIG. 2 is an alternative display system for the embodiment shown in FIG. 1.

The present invention comprises in its most general aspect a distance pickup probe for developing a signal that relates in frequency to the contour of each gear tooth. As the varying frequency signal goes through a given value a trigger pulse is generated. This signal level in the preferred embodiment would be representative of a selected reference point on the leading edge profile of the gear teeth. The first trigger pulse initiates the voltage rise in a ramp generator and the next pulse terminates the rise—this action repeats itself with each trigger pulse. A pair of alternately operative hold circuits reads out each peak value voltage of the rise time generator. In this way a continuous series of square wave pulses is developing representing the spacing between succeeding teeth in the gear. These pulses are also averaged and compared for deriving a voltage that is indicative of the instantaneous single tooth deviation from the average spacing.

Referring now to the attached drawing, there is shown a complete schematic of the gear inspection and measurement system of the present invention and in this specific embodiment operative to measure the single tooth deviation from average spacing. In operation of the system the workpiece gear 10 is rotatably mounted by conventional material handling means and rotated at a uniform rate. The probe 15 is fixed in a vertical position to probe each gear tooth 11 through 13, at its forward edge. This probe 15 is preferably that disclosed in the co-pending application S.N. 36,662 filed June 16, 1960, now Patent No. 3,180,136, for Transducer, non-contacting probe but, may take other non-contacting forms such as the capacitance or light type of pickup. As each gear tooth is passed beneath the focus point, the pickup will respond in a manner as set forth in the co-pending application. In this embodiment direct relation to the physical dimensions of the gear tooth at the pitch diameter will be indicated.

The pickup 15 is connected to a sensing circuit 20 having its frequency variable with its input. This circuit may be a conventional frequency modulated oscillator circuit wherein the signal from the pickup frequency modulates the output of the sensing oscillator. In consequence the frequency modulated signal from the sensing circuit oscillator 20 will be a pulsating signal, having a waveform $a, b, c. \ldots n$, conforming to that of the physical dimensions of each gear tooth 11, 12, 13 $\ldots$ $n$ at the pitch diameter.

The pulsating signal from the sensing circuit 20 is connected to an amplitude gate circuit 25, designed to give a sharp series of pulses in response to the gating or triggering signals $a, b, c, \ldots n$. The amplitude gate circuit 25 is a conventional pulse generator biased to be gated on as the voltage curve at its input goes through the point (attains an amplitude) corresponding to the pitch diameter. The pitch diameter is illustrated as the reference line $x$. There results then from the amplitude gate circuit 25, upon being actuated by the pulses $a, b, c, \ldots n$, a series of sharp pulses $a^1, b^1, c^1, \ldots n^1$ in a timing sequence corresponding to the spacing at the pitch diameter 11$a$, 12a, 13a, . . . n between sequential gear teeth 11, 12, 13, . . . n.

The pulses $a^1$, $b^1$, $c^1$, . . . $n^1$ are fed simultaneously to a ramp generator 30 and to a flipflop switch gate 35. Generally, the ramp generator 30 has a dual output circuit 40 and 45 and a dual hold circuit 50 and 55. In operation, as one output circuit is building up in voltage, the other hold circuit is holding its peak voltage. Each incoming pulse reverses the action. More specifically, the pulse $a^1$ initiates the rise time voltage in the ramp generator 30, in a manner similar to a saw tooth generator or other rise-time generator. This signal $a^2$ continues to build up in amplitude in the first output circuit 40 until the arrival of the pulse $b^1$. This second pulse $b^1$ actuates the switch gate 35, which in turn causes the first hold circuit 50 to maintain the peak level of the output volage $b^2$ built up in the first ramp generator output circuit 40. At the same time, the switch circuit 35 transfers the ramp generator 30 to a second output circuit 45. This second pulse $b^1$ returns the ramp generator 30 to zero level and permits the voltage $b^3$ to build up again in the second output circuit 45 until the arrival of the next pulse $c^1$. At this instant the second hold circuit 55 is switched in to maintain the peak level of the output voltage $c^3$ in the second ramp generator output circuit 45. Simultaneously, the first ramp generator output circuit 40 is returned to zero level and again begins to build up at $c^2$. This sequence of operation of building up and holding with each incoming pulse continues with each gear tooth inspected.

The switch 35 is a two-stage switch actuated from one steady state condition to another by an incoming signal from the amplitude gate circuit 25. In order to combine the outputs of the two-ramp generator hold circuits 50 and 55 the switch gate 35 comprises two switch sections 36 and 37 ganged together by shaft 38 for simultaneous action. In this way when the ramp generator 45 via hold circuit 55 is being read out ramp generator output 40 is building up to its peak action signal, and when ramp generator output circuit 45 is building up to its peak signal the hold peak signal from ramp generator 40 via hold circuit 50 is being read out. Specifically as a result of the ganging of the two switches 36 and 37, when the switch arm 36a is feeding the pulses from the ramp generator to its output circuit 40 by contact terminal 36b, the hold peak level signal of the ramp generator output circuit 45 is being read out by connection of the arm 37a to the terminal 37c. When the switch gate arm 36a is connected to the terminal 36c to feed the pulses from the ramp generator to the output circuit 45, the output of the hold circuit 50 is read out by connection to terminal 37b. In essence, the switching action of switch 37 permits a step type of output waveform $a^4$, $b^4$, $c^4$, etc., to be obtained each step alternately corresponding to the peak level signals of the dual hold output circuits 50 and 55 of the ramp generator 30. The hold level of each circuit represents the elapsed time between pulses and hence a voltage having an amplitude representing distance between pulses.

The two ramp generator output circuits 40 and 45 are shown in FIG. 1 as two separate circuits for purposes of explanation. In actuality there would be a single output circuit for the ramp generator 30 with a pair of hold circuits. That is, the ramp generator would be triggered on and off with each incoming pulse and the hold circuits 50 and 55 alternately being charged and discharged at the peak level of each rise time buildup.

The peak level signals $a^4$, $b^4$, $c^4$, . . . $n^4$ from the output circuits 50 and 55 are integrated in a simple resistance-capacitance network in integrator 60 to arrive at an average analog signal. The average signal is compared in an error detector circuit 65 with a standard voltage calibrated in volts per degree and predetermined to be that representative of the spacing between successive teeth at the pitch diameter. This standard voltage may be derived from a simple voltage divider network 70 having a number of dividers 70a to 70n corresponding to the number of spacing between teeth in the gear 10. A typical voltage divider network would comprise a source of B+ potential 72 and ground 73. This voltage is then divided by resistance 71 having the said number of contacts 70a–70n. The voltage divider circuit 70 having a given resistance and connected across a fixed voltage between B+ and ground would provide given incremental voltages. Utilizing, therefore, each of the contacts 70a to 70n would be representative of voltages across one particular gear. This is, of course, exemplary and the voltage divider circuit may be further utilized to represent the standard average voltage for gears of various number of teeth depending upon where the switch arm 74 is initially set.

The voltage divider circuit 70 is intended for purposes of illustration and therefore is shown schematically without its mechanical function. The switch arm 74 may be rotated manually to indicate—one at a time—the spacing between successive gears.

The error signal from the error detector 65 that is indicative of the difference between the sampled average voltage and the standard voltage is fed back to the ramp generator 30 to adjust a setting on the ramp generator power supply. In this way, the ramp generator circuit is continuously calibrated and maintained at a balance.

The peak level signals $a^4$, $b^4$, $c^4$, . . . $n^4$ from the two ramp generator output circuits 50 and 55 are also compared with the average analog signal from integrator 60 in a difference comparator circuit 75. From this comparator circuit 75 there is derived the instantaneous single tooth deviation from the average spacing. The deviation signal from comparator 75 is calibrated in degrees to indicate the lead or the lag of the instantaneous tooth spacing from the average. The readout system may comprise a peak reading voltmeter 80a and/or an oscilloscope (not shown).

In the production of gears or similar products on a large scale, it may be desired to look at the spacing between teeth for the entire gear at once. This would serve two very important purposes: first, if the spacing is uniform throughout the entire gear, comparison of tooth to tooth would be an unnecessary operation; secondly, in all probability, if a non-uniform spacing should occur, this same non-uniform spacing would occur in succeeding gears. A recurring non-uniformity would indicate a certain malfunction in the manufacturing process. To view each tooth in a gear structure simultaneously, reference is made to the embodiment shown in FIG. 2, wherein an X–Y presentation system is shown. The voltage divider switch circuit 85 is substantially the same as 70 of FIG. 1, with certain modifications. The switch in this arrangement is not manually adjusted but is connected to or comprises a part of commutator 80. Specifically, as shown in FIG. 2, voltage divider circuit 85 comprises evenly spaced contacts in a 360° arrangement. Connected to each contact (dividers) 86a to 86n is a tap 81a to 81n, respectively, on the resistive element 81. In this way, contact 86a will provide the smallest voltage increment and 86n will provide the largest voltage increment. As understood with respect to divider 70n in FIG. 1, divider 86n in FIG. 2 represents an indefinite number. The number of contacts on voltage divider 85 correspond to the number of spacings between teeth in the gear 10. The commutator 80 has a terminal for each tooth in the gear 10 and a switch arm 84 that is linked via shaft 38a to shaft 38 connecting the two position switches 36 and 37. Simply, switch 85 advances one position with each change of state in the switches 36 and 37. The commutator 80 is conventional and may comprise a mechanical movement or may be pulse actuated. Also connected to each terminal is a voltage derived from the voltage divider network comprising resistor 81 between B+ source 82 and ground 83. The voltage increment at each terminal 86a–86n is fed via line 84a to the X coordinate of an X–Y screen oscilloscope 90. An oscilloscope having X–Y inputs is available commercially and may be the DuMont 436. The X coordinate is divided to represent across the screen a total division representing the total voltage across the resistor 81. In this way each segment of the coordinate will represent one division. As the switch arm 84 rotates, that particular segment represented by the contact being made will be actuated and fed to the oscilloscope 90.

As pointed out above, the signal indicative of the spacing between succeeding teeth is compared in comparator 75 with an average signal from the integrator 60. The difference signal in the embodiment of FIG. 2 is fed to the Y coordinate of the X–Y screen oscilloscope 90. As pointed out above, the voltage increment at succeeding terminals 86a–86n of divider 85 is representative of the spacing between succeeding teeth in the gear 10. Therefore, since the fixed incremental voltages are fed to the X coordinate and the difference signals from the comparator 75 are fed to the Y coordinate, there is a visual display 52 on the scope 90 of each spacing relative to the desired spacing. If the contact 86a—the first contact having the smallest voltage increment—is synchronized, i.e., the rotation of the gear 10 with the commutator 80, to represent the spacing from the first tooth in the structure 86n—the last contact having the largest voltage increment—to represent the spacing from the last tooth in the structure, there will be plotted on the X–Y scope 90 a straight line graphical representation 52. This straight line graph will be representative in a timing sequence of each of the spacings at the pitch diameter 10a, 12a, 13a, . . . n between sequential teeth 12, 13, n of gear 10 shown in FIG. 1. If the plotted graph 52 is a straight line function then the gear structure, i.e., spacing between teeth approaches perfection and no further inspection is necessary. In this way, the inspection system is further simplified. On the other hand, if the spacing is off between any two teeth and the same off-spacing should recur, this would be an indication of a malfunction in the manufacturing process.

If it is desired to have a permanent record of the gear spacing an X–Y recorder may be substituted for the oscilloscope 90. Also the gear tooth may be scanned horizontally by the probe 15 if it is desired to measure the spacing between teeth at other than their forward edge.

Although only a certain and specific preferred embodiment is shown and described above, it is to be understood that modifications and departures may be made thereto without departing from the true spirit and scope of the invention.

What is claimed is:

1. A system for measuring the dimensions between sections or parts of a product comprising means for generating a first voltage varying in frequency in accordance with the contour of said sections, said means comprising a distance probe and a sensing oscillator, and means for connecting the signal from said distance probe to said oscillator to modulate the output thereof, a ramp generator for developing a second voltage linearly rising in amplitude from a zero level, means connecting said first voltage to said ramp generator to repetitively initiate and terminate said linearly rising voltage each time said first voltage exceeds a predetermined level, means for averaging the peak value voltages from said ramp generator, means for comparing the instantaneous peak values of said voltages with said average voltage, and means for indicating the difference of said compared voltages as representing the deviation of the dimensions between succeeding sections of said product from an average.

2. A system for measuring the spacing between teeth in a gear structure comprising a distance probe for generating a first voltage varying in frequency in accordance with the contour of said teeth, a sensing oscillator circuit and means connecting said first voltage thereto for modulating the output thereof, a pulse forming circuit biased to generate a pulse at a predetermined amplitude level, means connecting said varying frequency output signal to said pulse forming circuit to generate a pulse each time said signal passes through said predetermined level, a ramp generator for developing a second voltage linearly rising in amplitude from a zero level, means connecting said pulses to said ramp generator to repetitively initiate and terminate said linearly rising voltage with each succeeding pulse, a pair of hold circuits and a two state switching circuit, means connecting the first state of said switching circuit to the first hold circuit to indicate the peak value of a first voltage output of said ramp generator and connecting the second state of said switch to the other of said hold circuits to indicate the peak value of said succeeding voltage from said ramp generator, and means for alternatingly changing states in said switching circuit to alternatingly indicate the peak value voltage outputs of said ramp generator.

References Cited by the Examiner
UNITED STATES PATENTS

| | | | |
|---|---|---|---|
| 2,457,727 | 12/1948 | Rifenbergh | 33—179.5 |
| 2,562,913 | 8/1951 | Heeren | 324—78 |
| 2,563,816 | 8/1951 | Butman | 328—133 |
| 2,913,662 | 11/1959 | Hogan | 324—70 |

WALTER L. CARLSON, *Primary Examiner.*

F. A. SEEMAR, R. J. CORCORAN, *Assistant Examiners.*